United States Patent [19]

Smith

[11] Patent Number: 5,437,595

[45] Date of Patent: Aug. 1, 1995

[54] METHOD & APPARATUS FOR PRODUCING MEDICAL POUCHES

[75] Inventor: Olly V. Smith, Greenville, S.C.

[73] Assignee: W. R. Grace & Co., Duncan, S.C.

[21] Appl. No.: 88,693

[22] Filed: Jul. 8, 1993

[51] Int. Cl.⁶ .......................... B31B 1/84; B31B 1/64
[52] U.S. Cl. ................................. 493/213; 493/189
[58] Field of Search ............... 493/189, 193, 194, 195, 493/213

[56] References Cited

U.S. PATENT DOCUMENTS

| 4,445,550 | 5/1984 | Davis et al. | 141/329 |
| 4,484,904 | 11/1984 | Fowler | 493/213 |
| 4,643,926 | 2/1987 | Mueller | 428/35 |
| 4,645,482 | 2/1987 | Yoshida | 493/189 |
| 4,650,452 | 3/1987 | Jensen | 493/213 |
| 4,695,337 | 9/1987 | Christine | 156/69 |
| 4,779,397 | 10/1988 | Christine et al. | 53/410 |
| 4,836,691 | 6/1989 | Suzuki et al. | 493/189 |
| 4,891,253 | 1/1990 | Mueller | 428/35 |
| 4,947,621 | 8/1990 | Christine et al. | 53/451 |
| 5,110,041 | 5/1992 | Keeler | 229/125 |

FOREIGN PATENT DOCUMENTS 0269419 11/1987 European Pat. Off. .

Primary Examiner—Jack W. Lavinder
Attorney, Agent, or Firm—Thomas C. Lagaly

[57] ABSTRACT

The present invention relates to a method of making flexible film pouches having fitment tubes attached thereto. The process includes a single operation for the simultaneous sealing of the pouch edge seams and the fitment tubes to the pouch. An apparatus for producing pouches with fitment tubes sealed thereto as well as the pouches so produced is also disclosed.

14 Claims, 3 Drawing Sheets

METHOD & APPARATUS FOR PRODUCING MEDICAL POUCHES

BACKGROUND OF THE INVENTION

1. Field of the Invention

This invention relates to a method and apparatus for sealing flexible films, and for attaching fitment tubes thereto, to make pouches suitable for the packaging of medical solutions, and also suitable for use as ostomy pouches or bags. In particular, the present invention relates to a one step method and an apparatus for attaching fitment tubes to, and sealing flexible films in the form of pouches that retain their clarity after filling and for heat sterilization.

2. Description of the Related Art

Currently, it is common medical practice to supply liquids such as medical solutions for parenteral administration in disposable, flexible pouches. These pouches should be characterized by collapsibility, transparency, and adequate mechanical strength. They must also be able to resist the relatively high temperatures required for heat sterilization of their contents, for example in an autoclave. Typically, medical solutions and the like are autoclaved at about 255° F., for periods of 15 to 50 minutes.

Commonly, such flexible pouches are typically made from a highly plasticized polyvinyl chloride. While meeting the requirements mentioned above, polyvinyl chloride may have some undesirable properties for use as a medical solution pouch because of the possibility of migration of plasticizer from the polyvinyl chloride into the medical solution or the other contents of the pouch so that the solution may become contaminated by potentially toxic material. A question has also arisen concerning whether PVC is adequately chemically neutral to medical solutions. It has also been found that polyvinyl chloride becomes brittle at relatively low temperatures.

In these flexible pouches it is desirable to include means for accessing the container (hereinafter "fitments"). Fitments provide a means for establishing fluid communication between the container and the outside environment.

Flexible pouches with fitments can be produced by form, fill and seal packaging machines. Form, fill and seal packaging machines provide an apparatus for forming a web of film into a flexible container housing a desired product. Typically, these machines include a former or mandrel, a fill tube, and heat sealers. The former or mandrel forms or folds the web of film into a tubular shape around a fill or film tube. The film tube is utilized to dispense the material to be packaged into the tubular shaped web of film. In these typical form, fill and seal packaging machines, fitments are attached with an impulse heat sealing system. Typical apparatus of this type is disclosed, for example, in U.S. Pat. No. 4,779,597 issued Oct. 25, 1988 to Christine et al. Another form of this type of apparatus is disclosed in U.S. Pat. No. 4,695,337 issued Sep. 22, 1987 to Christine. A vertical form, fill and seal apparatus for making three side fin pouches is disclosed in U.S. Pat. No. 4,947,621 issued Aug. 14, 1990 to Christine et al.

Fitments suitable for sealing directly to a film web in apparatus as described hereinabove are, for example, those disclosed in U.S. Pat. No. 4,445,550 issued May 1, 1984 to Davis et al and U.S. Pat. No. 5,110,041 issued May 5, 1992 to Keeler. These fitments are not adaptable for use on fitment tubes, but instead must be sealed directly to the pouch film web.

Flexible pouches suitable for medical solutions which do not have the drawbacks of PVC and which maintain their clarity as well as their collapsibility, and mechanical strength are known, for example, from U.S. Pat. No. 4,643,926 issued Feb. 17, 1987 to Mueller and U.S. Pat. No. 4,891,253 issued Jan. 2, 1990 to Mueller. Sealing fitment tubes to these films using impulse sealing and RF sealing do not produce the necessary seal integrity to prevent leaking, however.

Another method of sealing a fitment tube to a flexible pouch is disclosed in European Patent No. EP-269419-A issued Sep. 29, 1988 to Craig Med. Prod. Ltd., wherein a separate sleeve of material is placed over the fitment tube and crimped and then heat sealed. This sleeve is a critical part of the invention required to realize the seal between the fitment tube and the flexible pouch.

Traditionally these flexible pouches are made of PVC and the fitment tubes, also of PVC, are sealed to the pouches using RF energy. RF energy, however, does not produce the necessary hermetic seal with many of the flexible films which retain their clarity as well as their flexibility and strength. Likewise, impulse heat sealing has been utilized with PVC in the past, but it too fails to provide the necessary hermetic seals due to limitations of forming the heated wire in the shapes necessary to seal a circular cross section fitment tube to a pair of flat sheets of flexible film. U.S. patent application Ser. No. 07/942,565 filed Sep. 9, 1992 discloses a method and apparatus for hermetically sealing fitment tubes to flexible film pouches having an opening therein to receive the fitment tubes. This procedure, however, requires a two step process of first making the pouch and then inserting and sealing the fitment tubes into the pouch.

Thus, there is a need for a method and apparatus to attach fitments to flexible pouches which overcome the limitations of PVC flexible pouches, produce and maintain a strong, leak free, hermetic seal between the fitments tubes and the flexible film web, and do all of this in a single step pouch producing operation.

OBJECTS AND SUMMARY OF THE INVENTION

It is an object of the present invention to provide a method of producing flexible film pouches having fitment tubes attached thereto in a single step operation.

Another object of the present invention is to provide an apparatus for producing the fitment tube/flexible film seal.

A further object of the present invention is to provide a means of sealing the flexible film pouches and sealing fitment tubes to these flexible film pouches, which can maintain their hermetic seal integrity under the adverse conditions encountered in use as medical solution containers, in a single operation.

Still another object of the present invention is to provide flexible film pouches having fitment tubes which accept a wide range of fitments commonly used in the medical field for the application of parenteral solutions.

Accordingly, one form of the present invention relates to a method of a method of making flexible film pouches having fitment tubes attached thereto comprising the steps of: introducing a web of flexible film into an open film sealing means for forming the peripheral seams defining at least one pouch; introducing at least one fitment tube, mounted on fitment tube sealing means between the layers of the web of flexible film within the open film sealing means; closing the film sealing means; forming the peripheral pouch seals and sealing the fitment tubes in the thus formed pouch using RF energy sealing; introducing said pouch to a cutting means and contouring the pouch and removing it from the web of flexible film; the improvement comprising using a single RF energy source which is connected 90 degrees out of phase between the film sealing means and the fitment tube sealing means, thereby producing a flexible film pouch having fitment tubes attached thereto in a single step sealing operation.

Another form of the present invention relates to a method of an apparatus for forming flexible film pouches having fitment tubes sealed therin comprising: a pouch sealing means comprising: a pair of RF energy heated dies, each die comprising an RF and thermally conductive body having an RF heating means; and a sealing area, having fitment tube locating channels therein; and at least one fitment tube sealing means comprising: a RF energy heated RF and thermally conductive body shaped to have a fitment tube placed on it and being connected 90 degrees out of phase to the same RF heating means connected to said dies.

Preferred forms of the invention, as well as other embodiments, objects, features and advantages of this invention, will be apparent from the following detailed description, and illustrative embodiments thereof, which are to be read in connection with the accompanying drawings.

DESCRIPTION OF THE PREFERRED EMBODIMENTS OF THE INVENTION

Figure 1:
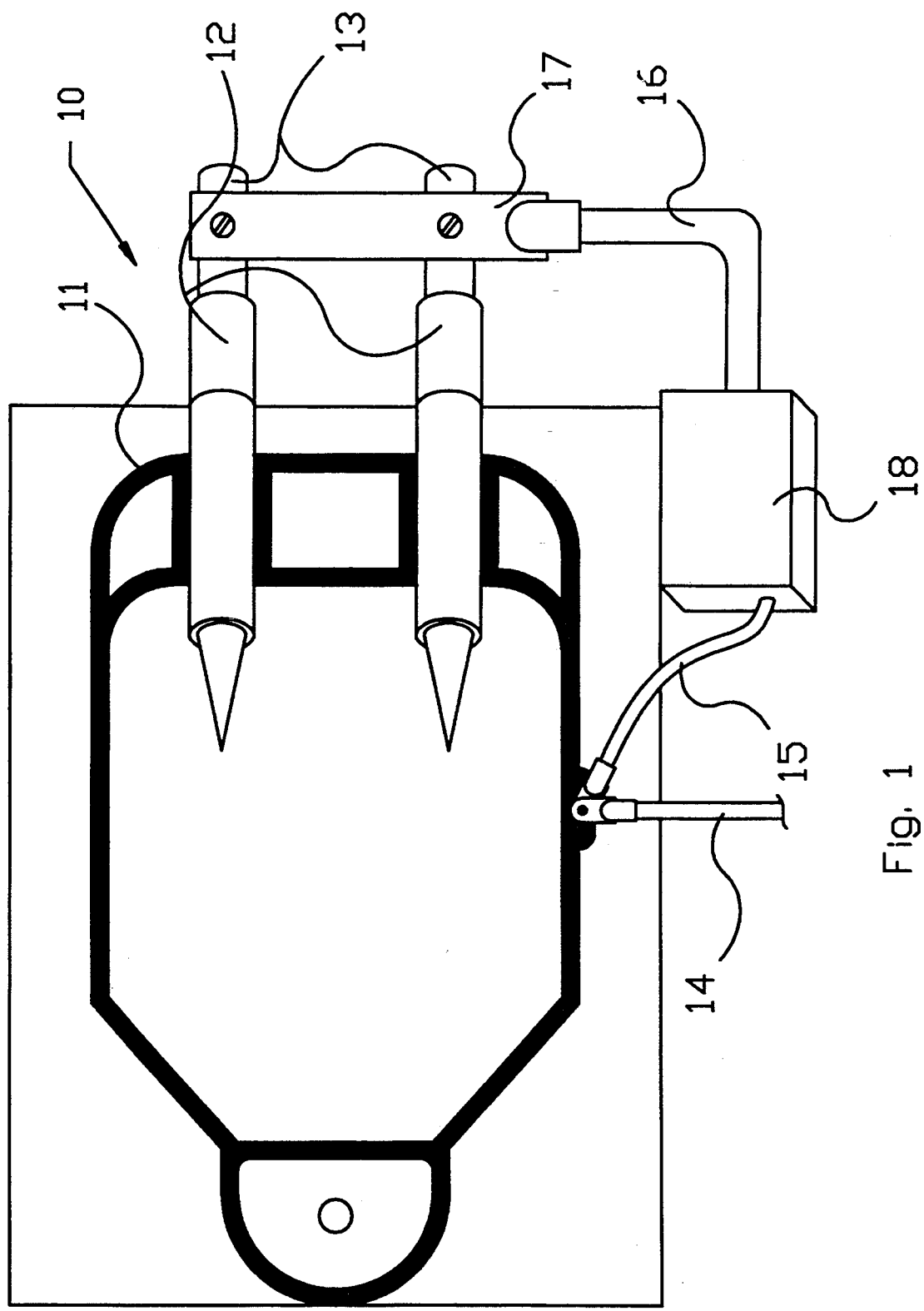
FIG. 1 is a top plan view of a flexible film pouch forming sealing die and fitment tube sealing rods of the present invention.

The terms "flexible" and the like and "elastomeric" and the like are used herein to define specific polymeric materials as well as characteristics of a resulting pouch or bag whereby improved flexibility and/or collapsibility of the pouch or bag is obtained by the use of these specific polymeric materials. Flexible materials may be characterized by a modulus of preferably less than 50,000 PSI (ASTM D-882-81) and more preferably less than 40,000 PSI (ASTM-D-882-81).

The term "film" and the like refers to a thermoplastic material suitable for packaging and having one or more layers of polymeric materials which may be bonded by any suitable means well known in the art.

The term "polymer", "polymeric", and the like, unless specifically defined or otherwise limited, generally includes homopolymers, copolymers and terpolymers and blends and modifications thereof.

The term "interior" and the like is used herein to refer to a layer of a multilayer film which is not a skin or surface layer, or sealant layer, of the film.

The term "surface layer" and the like is used herein to refer to the layer of a multilayer film which becomes the outside surface of the pouch or bag.

The term "sealant layer" and the like is used herein to refer to the layer of a multilayer film which becomes the inside surface of the pouch or bag and is used to form the bag or pouch periphery seals as well as sealing to the fitment tubes.

The term "melt flow" and "melt flow index" is used herein as the amount, in grams, of a thermoplastic resin which can be forced through a given orifice under a specified pressure and temperature within 10 minutes. The value should be determined in accordance with ASTM D 1238-79.

The term "very low density polyethylene" is used herein to define a linear ethylene alpha olefin copolymer with densities below 0.915 gm/cc, preferably between 0.900 to 0.906 gm/cc and including densities as low as 0.860 gm/cc, as measured by ASTM D-1505.

The term "ethylene vinyl acetate copolymer" (EVA) is used herein to refer to a copolymer formed from ethylene and vinyl acetate monomers wherein the ethylene derived units in the copolymer are present in major amounts and the vinyl acetate derived unites in the copolymer are present in minor amounts.

The term "ethylene propylene copolymer" is used herein to refer to a copolymer formed from polypropylene monomer and minor amounts, usually less than 6%, of ethylene.

The term "copolyester" and the like is applied to polyesters synthesized from more than one diol and a dibasic acid. Copolyesters as used herein may also be characterized as copolymers of polyether and polyethylene terephthalate. More preferably copolyesters as used herein may be characterized as polymeric materials derived from 1,4 cyclohexane dimethanol, 1,4 cyclohexane dicarboxylic acid, and polytetramethylene glycol ether, or equivalents of any of the above, as reactants.

The term "modified" and the like is used herein to refer to a polymeric material in which some of all of the substituents are replaced by other materials, providing a change in properties such as improved flexibility or elastomeric properties.

The term "web" and the like is used herein to refer to a tubular film of thermoplastic material which may be split during the pouch or bag making operation or split prior to introduction to the pouch or bag making apparatus. It is also used herein to refer to sheets of thermoplastic material used in the manufacture of pouches or bags.

Flexible film suitable for medical solution pouches and parenteral materials for use with the present invention include generally, for example, films having a core layer of high density polyethylene, two intermediate layers comprising very low density polyethylene, and outer layer comprising an ethylene propylene copolymer or flexible copolyester, a sealant layer comprising a heat sealable polymeric material such as modified ethylene propylene copolymer, and two polymeric adhesive layers bonding the intermediate layers to the outer and sealant layers respectively. Suitable specific examples are disclosed for example in U.S. Pat. No. 4,891,253 issued Jan. 2, 1990 to Mueller and hereby incorporated by reference. A preferable flexible film suitable for medical solution pouches and parenteral materials for use with the present invention include generally, for example, films having a sealant layer of ethylene propylene copolymer, modified ethylene propylene copolymer, or flexible copolyester, one or more interior layers including elastomeric polymeric materials, and an outer layer of ethylene propylene copolymer or a flexible copolyester such as disclosed, for example, in U.S. Pat. No. 4,643,926 issued Feb. 17, 1987 to Mueller and hereby incorporated by reference. The currently preferred flexible film for use with the present invention is a multilayer film comprising a sealant layer of rubber modified ethylene propylene copolymer, an adhesive layer comprising a blend of rubber modified ethylene propylene copolymer and low density polyethylene, an interior layer of low density polyethylene, an adhesive layer of ethylene methacrylate and an outer layer of copolyester.

Yet another flexible film suitable for use in producing pouches or bags is one comprising at least one layer formed from a polymeric blend which includes about 40% to 60%, by weight, of any ethylene and vinyl-acetate copolymer and about 60% to 40%, by weight, of an elastomeric polyolefin such as disclosed for example in U.S. Pat. No. 4,687,711 issued Aug. 18, 1987 to Vietto et al and hereby incorporated by reference.

The flexible pouches may be of any desired size and shape. Typically, for medical solutions for parenteral administration the flexible pouches are generally rectangular in shape with rounded corners and having dimensions of about 180 mm wide by 350 mm long. It is to be appreciated that square corners and shapes other than rectangular may be produced within the teaching of the present invention and that such other shapes, corner geometries and sizes are contemplated by the present invention. It is to be further appreciated that these parameters and how to achieve them are well understood in the art and may be determined without undo experimentation by a routineer in the art.

Fitment tubes suitable for use in the present invention may be made of a single layer of polymeric material or may be made of multilayer polymeric material. The outside of the fitment tubes have a composition which is heat sealable to the sealant layer of the flexible film or can be hermetically sealed to the sealant layer of the flexible film. Suitable examples of fitment tube material include for example PVC tubing and preferably, a multilayer thermoplastic material having an outer layer of ethylene propylene copolymer, an adhesive layer of a ethylene vinyl acetate copolymer and an inside layer of PVC. Most preferably the fitment tubes are the multilayer thermoplastic material hereinabove disclosed which have been electronically crosslinked as is well understood in the art.

Suitable fitments include those commonly used and well understood in the art. These include for example, fitments as disclosed in U.S. Pat. No. 5,026,352 issued Jun. 25, 1991 to Anderson and U.S. Pat. No. 4,324,423 issued Apr. 13, 1982 to Pitesky. The preferred fitment shape is one having a circular cross section, but any desirable cross sectional shape which allows for hermetic sealing of the fitment to the fitment tubes is suitable. It is to be appreciated that the fitments may be attached to the fitment tubes either before or after the fitment tubes are sealed to the flexible film pouches.

Radio frequency (RF) heat sealing equipment is well known in the art. The use of heat sealing flexible films using RF energy is also well known. Thus, it is sufficient to say that the RF equipment suitable for use in the present invention is any of such equipment well known in the art used in well known ways. The routineer will appreciate that the flexible film sealing means incorporates 2 dies, one die which is connected to the RF system on the high side and one die which is connected on the ground or neutral side of the RF system. Generally, the RF system will operate at a frequency of from about 27 Megahertz to about 40 Megahertz. But not necessarily limited to the these frequencies. Flair system will operate with any frequency that will seal the pouches. It is also to be appreciated that likewise, the fitment tube sealing means is also connected to the same RF system through a phase shift device, such that the energy supplied to the flexible film sealing means is 90 degrees out of phase with the energy supplied to the fitment tube sealing means. Thus, when energy to seal the flexible film seams is being supplied to the flexible film sealing means no energy is being supplied to the fitment tube sealing means and vice versa. Such phase shift devices and their uses are also well known in the art. Radio frequency systems suitable for use in the present invention, and phase shifting devices suitable for use in the present invention are well known to those skilled in these arts.

Figure 2:
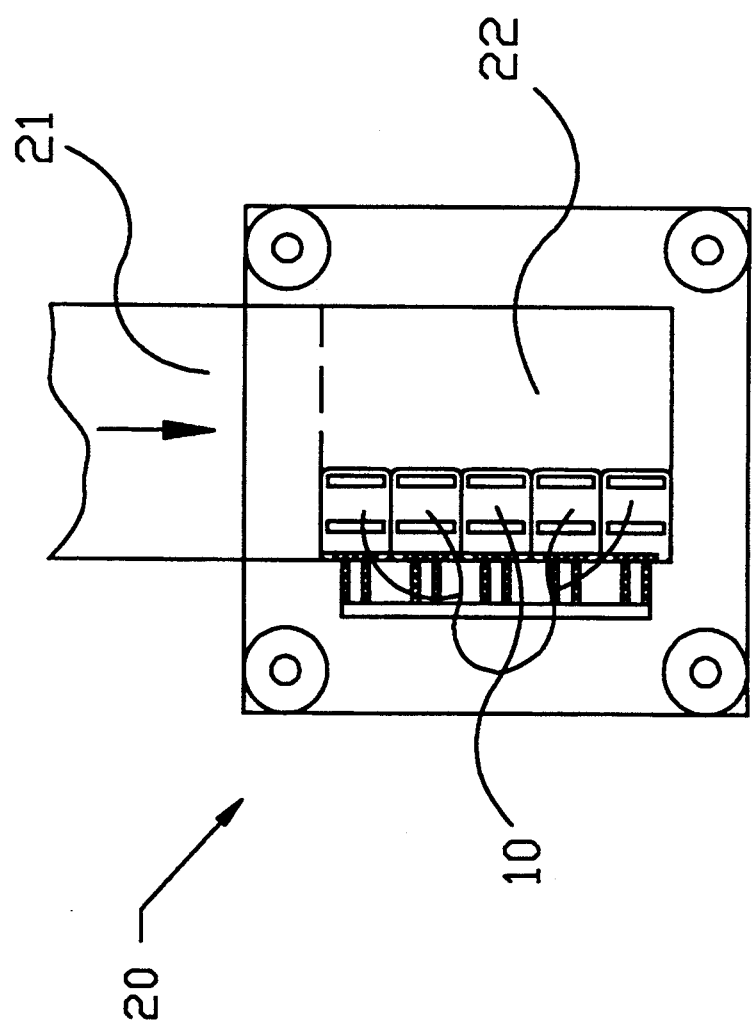
FIG. 2 is a top plan view of an apparatus for producing flexible film medical solution pouches using the flexible film pouch forming sealing die and fitment tube sealing rods of the present invention.

It has now been surprisingly found that fitment tubes as hereinabove described may be hermetically sealed to flexible film pouches hereinabove described in a single operation, or step, utilizing radio frequency (RF) sealing means. Turning now to the Figures, FIG. 1 shows a top plan view of a preferred embodiment of the present invention having a bottom die 10, and a top die 10 (not shown), both dies 10 having heat sealing area 11 defining the flexible film pouch shape and size. Also, shown are a pair of fitment tubes 12 mounted on a pair of fitment tube sealing rods 13. The dies 10 are electromagnetic energy connected to a RF power source (not shown) through cable 14. The fitment tube sealing rods 13 are likewise connected to the same RF power source (not shown) by way of cables 15 and 16, connecting means 17 and phase shift device 18. With reference to FIGS. 1 and 2, the method and apparatus of the present invention will be disclosed by describing a single cycle of the method and apparatus. FIG. 2 shows a top view of an apparatus 20 suitable for making flexible film pouches with fitment tubes of the present invention. In practice the flexible film web 21 is fed into a sealing means 22, by a feeding means (not shown). The sealing means contains at least one set of sealing dies 10 and fitment tube sealing rods 13 having fitment tubes 12 located thereon and said fitment tube sealing rods 13 containing said fitment tubes 12 located between the layers of said flexible film web 21. The top die 10 and the bottom die 10 are closed upon one another by a means not shown and pressure and RF heat sealing are used to produce the pouch peripheral seam seals and seal the fitment tubes in place in a single operation. The RF energy is supplied from a source (not shown) through cables 14, 15, and 16, connecting means 17 and phase shift device 18. The dies are then opened by a means not shown and the finished bags exit the sealing means 22, by a feeding means (not shown). If the sealing means 22 also includes a bag separating means (not shown) the finished bags are cooled and processed for filling, and packaging. If the sealing means 22 does not have a separating means, the bags are introduced into a cutting means (not shown) by feeding means (not shown) and cut apart before being processed for filling and packaging. It is also to be appreciated that fitments may be attached to the ends of the fitment tubes during the automated process either before or after sealing of the fitment tubes is accomplished as is also well understood in the art.

Figure 3:
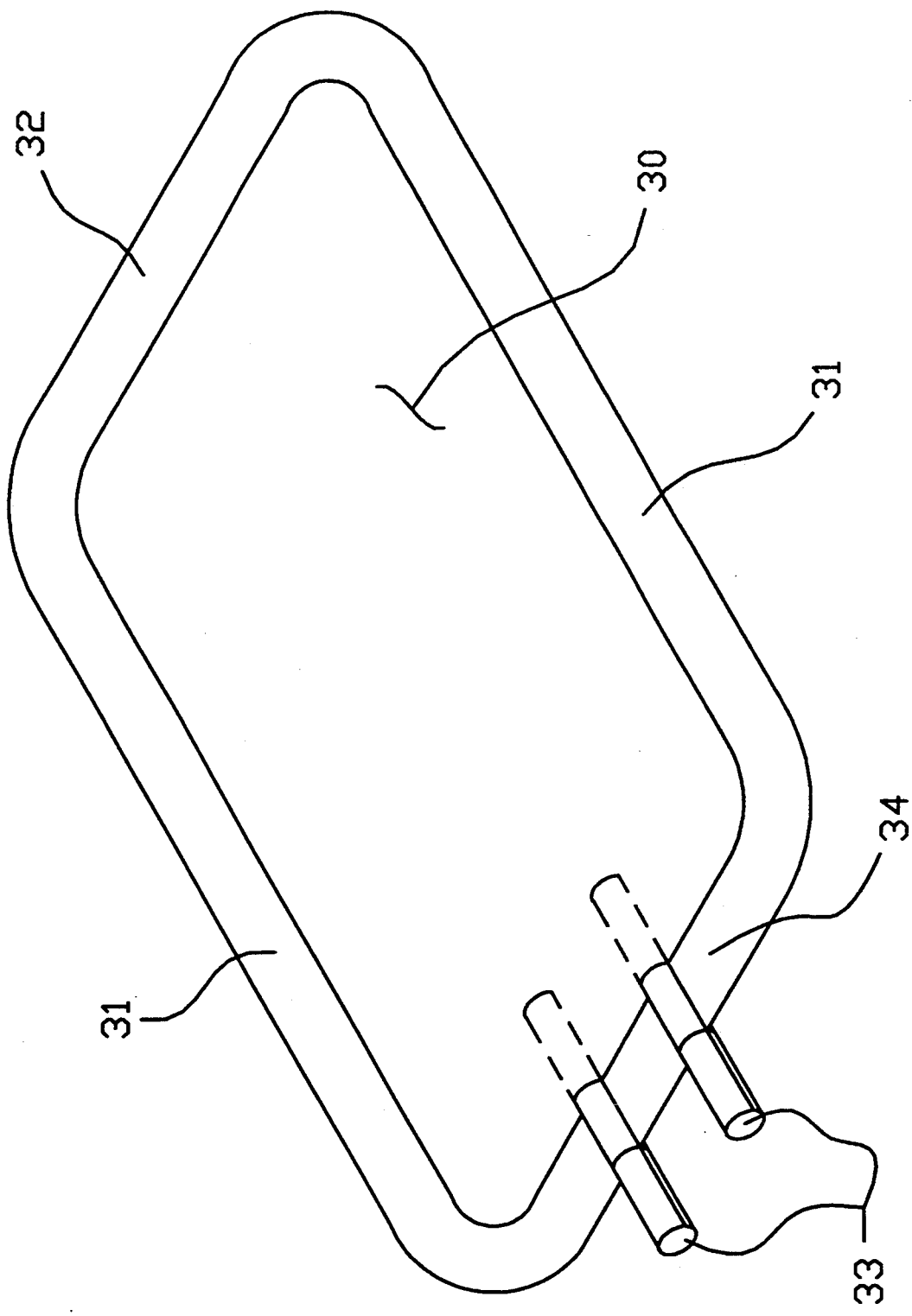
FIG. 3 is an isometric view of a flexible pouch with fitment tubes according to the present invention.

FIG. 3 shows an isometric view of the flexible film pouch 30 of the present invention having side seams 31, bottom seam 32, fitment tubes 33 sealed at top seal 34.

The sealing dies and fitment tube sealing rods may be made of any suitable material, preferably metal, such as for example, stainless steel, aluminum, copper, brass, other non-ferrous metal, and alloys thereof. The sealing dies are most preferably aluminum and the fitment tube sealing rods are most preferably brass. The sealing dies and fitment tube sealing rods may also be made of ceramic materials well known in the art.

The sealing dies 10 are always used in pairs. Thus, there is always an upper sealing die 10 and lower sealing die 10 positioned such that the flexible film and the fitment tubes are clamped between the upper and lower sealing dies 10 under pressure. Both sealing dies are heated, warmed and/or cooled to the same temperature. The pressure used to clamp the film and fitment tubes during sealing and/or cooling is from about 200 psi to about 400 psi, preferably about 275 psi.

In all instances the sealing die 10 has a release coating covering the sealing area 11. The release coating may be either non-compliant or compliant. The term "compliant" and the like is used herein to refer to a release coating which allows some movement of the fitment tubes in relation to the flexible film layers during the sealing process. The term "non-compliant" and the like is used herein to refer to a release coating which does not provide for movement of the fitment tubes in relation to the flexible film layers during the sealing process. Release coatings may be any coating which can hold its integrity at the processing temperatures it is exposed to and which will not stick or seal to the fitment tubes or flexible film. Currently preferred non-compliant release coatings include tetrafluoroethylene, such as TEFLON brand tetrafluoroethylene and glass filled tetrafluoroethylene. A preferred coating is a tetrafluoroethylene particle coating infused into the surface of the metal die body and into the surface to the metal fitment tube rods. This preferred coating may be obtained from General Magnaplate Corp. of Linden, N.J., using their NEDOX ® SF-2R, TUFFRAM ® 604 or TUFFRAM ® 615 coatings. Currently preferred compliant release coatings include aluminum particle containing silicone rubber, such as for example, COHRlastic ® conductive silicone rubber available from CHR Industries of New Haven, Conn.

It is to be understood that the dies may be initially heated to some temperature below the sealing temperature and such temperature maintained by a heating source other than RF energy. The RF energy being used only to increase the temperature to the sealing temperature during the actual sealing operation. This would lighten the load requirements of the RF energy supply which may be advantageous in some instances.

While the present invention has been shown where the flexible film pouches are made and fitment tubes sealed thereto and then filled with a product at a later time it is to be appreciated that the pouches may be filled immediately after completion of the pouch producing and fitment tube sealing operation and further that the pouches may be made in a vertical position and filled immediately after the pouch with the fitment tubes is produced.

Although the illustrative embodiments of the present invention have been described herein with reference to the accompanying drawings it is to be understood that the invention is not limited to those precise embodiments, and that various other changes and modifications may be effected therein by one skilled in the art without departing from the scope or spirit of the invention.

What is claimed is:

1. A method of making flexible film pouches having fitment tubes attached thereto comprising the steps of:
   a) introducing a web of flexible film into an open film sealing means for forming the peripheral seams defining at least one pouch;
   b) introducing at least one fitment tube, mounted on fitment tube sealing means between the layers of the web of flexible film within the open film sealing means;
   c) closing the film sealing means;
   d) forming the peripheral pouch seals and sealing the fitment tubes to the layers of the web of flexible film in the thus formed pouch using RF energy sealing;
   e) introducing said pouch to a cutting means and contouring the pouch and removing it from the web of flexible film;
   the improvement comprising using a single RF energy source for supplying said RF energy to both the film sealing means and the fitment sealing means, said RF energy source having a phase shift device for phase shifting said RF energy such that the RF energy supplied to the film sealing means is 90 degrees out of phase with the energy supplied to the fitment sealing means, thereby producing a flexible film pouch having fitment tubes attached thereto in a single sealing operation.

2. The method as claimed in claim 1 wherein, at least two fitment tubes are sealed to each pouch.

3. The method as claimed in claim 1 wherein, a plurality of pouches having fitment tubes sealed thereto are produced simultaneously.

4. The method as claimed in claim 1 wherein, said flexible film sealing means and said fitment tube sealing means have a temperature of from about 250° F. to about 500° F., preferably about 350° F.

5. The method as claimed in claim 1 wherein, said flexible film sealing means seal the film web together and the fitment tubes to the film web at from about 200 psi to about 400 psi, preferably about 275 psi.

6. The method as claimed in claim 1 wherein, said RF system operates at a frequency of from about 27 Megahertz to about 40 Megahertz.

7. An apparatus for forming flexible film pouches having fitment tubes sealed therein comprising:
   a) a pouch sealing means for forming a peripheral seal on a pouch comprising: a pair of RF energy heated dies, each die comprising an RF and thermally conductive body having an RF heating means; and a sealing area, having fitment tube locating channels therein; and
   b) at least one fitment tube sealing means for sealing a fitment tube to a pouch comprising: a RF energy heated RF and thermally conductive body shaped to have a fitment tube placed on it and being connected to the same RF heating means connected to said dies; wherein the RF heating means has a phase shift device for phase shifting said RF energy such that the RF energy supplied to the pouch sealing means is 90 degrees out of phase with the energy supplied to the fitment sealing means so that a flexible film pouch having fitment tubes attached thereto can be produced in a single sealing operation.

8. The apparatus as claimed in claim 7 wherein, each of the pouch sealing means and the fitment tube sealing means are further characterized as having a release coating covering the sealing areas.

9. The apparatus as claimed in claim 8 wherein, said release coating is selected from the group comprising tetrafluoroethylene, and glass filled tetrafluoroethylene.

10. The apparatus as claimed in claim 8 wherein, said pouch sealing means is made of aluminum and said release coating is tetrafluoroethylene.

11. The apparatus as claimed in claim 7 wherein, the composition of said pouch sealing means and said fitment tube sealing means is selected from one of the group comprising steel, aluminum, copper, brass, non-ferrous metal, ceramics and alloys and combinations thereof.

12. The apparatus as claimed in claim 7 wherein, said pouch sealing means are composed of aluminum.

13. The apparatus as claimed in claim 7 wherein, said fitment tube sealing means is composed of brass.

14. The method as claimed in claim 7 wherein, said RF system operates at a frequency of from about 27 Megahertz to about 40 Megahertz.

* * * * *